United States Patent [19]

Roarty et al.

[11] E Patent Number: Re. 33,323

[45] Reissued Date of Patent: Sep. 4, 1990

[54] REFORMING PROCESS FOR ENHANCED BENZENE YIELD

[75] Inventors: John C. Roarty, Baton Rouge, La.; Murray Nadler, Houston, Tex.

[73] Assignee: Exxon Research & Engineering Company, Florham Park, N.J.

[21] Appl. No.: 204,754

[22] Filed: Jun. 10, 1988

Related U.S. Patent Documents

Reissue of:

[64] Patent No.: 4,594,145
Issued: Jun. 10, 1986
Appl. No.: 679,500
Filed: Dec. 7, 1984

[51] Int. Cl.[5] ..... C10G 37/06

[52] U.S. Cl. ..... 208/79; 208/93; 208/133; 208/138

[58] Field of Search ..... 208/79, 93, 133, 138

[56] References Cited

U.S. PATENT DOCUMENTS

| | | |
|---|---|---|
| 2,478,916 | 8/1949 | Haensel et al. . |
| 2,479,109 | 8/1949 | Haensel . |
| 2,867,576 | 1/1959 | Honeycutt . |
| 2,880,164 | 3/1959 | Viland . |
| 2,921,013 | 1/1960 | Mullineaux et al. . |
| 2,921,015 | 1/1960 | Shiras . |
| 2,937,132 | 5/1960 | Voorhies, Jr. . |
| 2,944,001 | 7/1960 | Kimberlin, Jr. et al. . |
| 2,944,959 | 7/1960 | Kline et al. . |
| 2,956,005 | 10/1960 | Lutz et al. . |
| 3,003,949 | 10/1961 | Hamilton . |
| 3,018,244 | 1/1962 | Stanford et al. . |
| 3,121,676 | 2/1964 | Skraba . |
| 3,159,565 | 12/1964 | Kimberlin, Jr. et al. . |
| 3,166,490 | 1/1965 | Evans . |
| 3,172,841 | 3/1965 | Paterson . |
| 3,216,789 | 11/1965 | Breck et al. . |
| 3,280,022 | 10/1966 | Engel et al. . |
| 3,305,476 | 2/1967 | York et al. . |
| 3,387,052 | 6/1968 | Addison . |
| 3,389,075 | 6/1968 | Addison . |
| 3,409,540 | 11/1968 | Gould . |
| 3,434,960 | 3/1969 | Jacobson et al. . |
| 3,649,520 | 3/1972 | Graven . |
| 3,753,891 | 8/1973 | Graven et al. . |
| 3,761,392 | 9/1973 | Pollock . |
| 3,770,614 | 11/1973 | Graven . |
| 3,776,837 | 12/1973 | Dautzenberg et al. . |
| 3,776,949 | 12/1973 | Gelbein et al. . |
| 3,844,935 | 10/1974 | Drehman et al. . |
| 3,867,512 | 2/1975 | Young . |
| 3,928,174 | 12/1975 | Bonacci et al. . |
| 4,002,555 | 1/1977 | Farnham . |
| 4,104,320 | 8/1978 | Bernard et al. . |
| 4,111,792 | 9/1978 | Caeser et al. . |
| 4,162 212 | 7/1979 | Miller . |
| 4,167,472 | 9/1979 | Dick et al. . |
| 4,203,826 | 5/1980 | Mayes . |
| 4,222,854 | 9/1980 | Vorhis, Jr. et al. . |
| 4,229,602 | 10/1980 | Brinkmeyer et al. . |
| 4,347,394 | 8/1982 | Detz et al. . |
| 4,358,364 | 11/1982 | Klosek et al. . |
| 4,401,554 | 8/1983 | Choi et al. . |
| 4,431,521 | 2/1984 | Roarty et al. . |
| 4,447,316 | 5/1984 | Buss . |
| 4,615,793 | 10/1986 | Jossens . |
| 4,636,298 | 1/1987 | Buss et al. . |
| 4,645,586 | 2/1987 | Buss . |
| 4,648,961 | 3/1987 | Jacobon et al. . |
| 4,650,565 | 3/1987 | Jacobson et al. ..... 208/138 |

FOREIGN PATENT DOCUMENTS

| | | |
|---|---|---|
| 2323664 | 4/1977 | France . |
| 2121788 | 1/1984 | United Kingdom . |

*Primary Examiner*—Curtis R. Davis
*Attorney, Agent, or Firm*—M. D. Bittman

[57] ABSTRACT

A process for reforming a full boiling range naptha feed to enhance benzene yield is disclosed which first separates the feed into a [$C_6$] *lighter* fraction [containing at least 10% by volume of $C_{7+}$ hydrocarbons] , *comprising at least one member selected from the group consisting of $C_6$, $C_7$, and $C_8$ hydrocarbons,* and a [$C_7$+] *heavier* fraction, then subjecting the [$C_6$] *lighter* fraction to a catalytic aromatization process [and subjecting the $C_7$+ fraction to a catalytic reforming process, followed by recovering the aromatics produced] *in the presence of a non-acidic catalyst.*

61 Claims, 2 Drawing Sheets

REFORMING PROCESS FOR ENHANCED BENZENE YIELD

Matter enclosed in heavy brackets [ ] appears in the original patent but forms no part of this reissue specification; matter printed in italics indicates the additions made by reissue.

BACKGROUND OF THE INVENTION

This invention relates to a process for reforming a full-boiling range hydrocarbon feed to enhance benzene yield by a combination of steps including separating the hydrocarbon feed into fractions, then separately treating the fractions by catalytic reforming the recovering the products. More particularly, the invention relates to a process for integrating a catalytic aromatization process which uses a catalyst superior in reforming $C_6$ [and $C_7$], *$C_7$, and $C_8$* paraffins with a catalytic reforming process utilizing a conventional reforming catalyst in a manner which enhances the benzene yield, increases energy efficiency and efficiently recovers the resulting products.

In a conventional reforming process, pentanes and lighter hydrocarbons ($C_{5-}$) are first removed with the $C_{6+}$ stream sent to a reformer followed by fractionation with the overhead sent to an extraction unit as shown in FIG. 2. While a substantial amount of aromatics (primarily toluene, xylenes and $C_9$ aromatics) are produced using a conventional reforming catalyst such as a Pt-Re gamma alumina catalyst, this process is not designed to maximize benzene yields.

FIELD OF THE INVENTION

The reforming of petroleum hydrocarbon streams is an important petroleum refining process which is employed to provide high octane hydrocarbon blending components for gasoline. The process is usually practiced on a straight run naphtha fraction which has been hydrodesulfurized. Straight run naphtha is typically highly paraffinic in nature but may contain significant amounts of naphthenes and minor amounts of aromatics or olefins. In a typical reforming process, the reactions include dehydrogenation, isomerization, and hydrocracking. The dehydrogenation reactions typically will be the dehydroisomerization of alkylcyclopentanes to aromatics, the dehydrogenation of paraffins to olefins, the dehydrogenation of cyclohexanes to aromatics, and the dehydrocyclization of paraffins and olefins to aromatics. The aromatization of the n-paraffins to aromatics is generally considered to be the most important because of the high octane of the resulting aromatic product compared to the low octane ratings for n-paraffins. The isomerization reactions include isomerization of n-paraffins to isoparaffins, the hydroisomerization of olefins to isoparaffins, and the isomerization of substituted aromatics. The hydrocracking reactions include the hydrocracking of paraffins and hydrodesulfurization if any sulfur compounds remain in the feedstock. On lighter naphtha streams, it is often desirable to avoid hydrocracking because of the resulting low carbon number of gaseous products which are the result.

It is well known that several catalysts are capable of reforming petroleum naphthas and hydrocarbons that boil in the gasoline boiling range. Examples of known catalysts useful for reforming include platinum and optionally rhenium or iridium on an alumina support, platinum on type X and Y zeolites (provided the reactants and products are sufficiently small to flow through the pores of the zeolites), platinum on intermediate pore size zeolites as described in U.S. Pat. No. 4,347,394, and platinum on cation exchanged type L zeolites. U.S. Pat. No. 4,104,320 discloses the dehydrocyclization of aliphatic hydrocarbon to aromatics by contact with a catalyst comprising a type L zeolite containing alkali metal ions and a Group VIII metal such as platinum.

The conventional reforming catalyst is a bi-functional catalyst which contains a metal hydrogenation-dehydrogenation component which is usually dispersed on the surface of a porous inorganic oxide support, notably alumina. Platinum has been widely used commercially in recent years in the production of reforming catalysts, and platinum on alumina catalyst have been commercially employed in refineries for the past few decades. In the last decade, additional metallic components have been added to platinum as promoters to further the activity or selectivity, or both, of the basic platinum catalyst, e.g., iridium, rhenium, tin and the like. Some catalysts possess superior activity, or selectivity, or both, as contrasted with other catalysts. Platinum-rhenium catalysts, by way of example, possess high selectivity in contrast to platinum catalysts. Selectivity is generally defined as ability of the catalyst to produce yields of $C_{5+}$ liquid products with concurrent low production of normally gaseous hydrocarbons, i.e., methane and propane.

There exist several processes for dividing naphtha feedstock into a higher boiling and a lower boiling cut and reforming these cuts separately. U.S. Pat. No. 2,867,576 discloses separating straight run naphtha into lower and higher boiling cuts, in which the higher boiling cuts are reformed with a hydrogenation-dehydrogenation catalyst with the liquid reformate produced being passed to an aromatics separation process. The paraffinic fraction obtained from the separation process is blended with the lower boiling naphtha fraction and the resulting blend is reformed with a reforming catalyst which may or may not be the same type employed in reforming the high boiling cut.

U.S. Pat. No. 2,944,959 discloses fractionating a full straight run gasoline into a light paraffinic fraction ($C_5$ and $C_6$) which is hydroisomerized with hydrogen and a pt-alumina catalyst, a middle fraction (end point of 320° to 360° F.) which is catalytically reformed with hydrogen and a pt-alumina catalyst, and a heavy fraction which is catalytically reformed with a molybdinum oxide catalyst and recovering the liquid products. U.S. Pat. Nos. 3,003,949, 3,018,244 and 3,776,949 also disclose fractionating a feed into a $C_5$ and $C_6$ fraction which is isomerized and a heavier fraction which is reformed.

Other processes for dividing feedstocks and separately treating them include: U.S. Pat. Nos. 3,172,841 and 3,409,540 which disclose separating fractions of a hydrocarbon feed and catalytically hydrocracking and catalytically reforming various fractions of the feed; U.S. Pat. No. 4,167,472 which discloses separating straight chain from non-straight chain $C_6$–$C_{10}$ hydrocarbons and separately converting to aromatics; and U.S. Pat. No. 4,358,364 which discloses catalytically reforming a $C_6$ to 300° F. B.P. fraction and producing additional benzene by hydrogasifying a $C_{5-}$ fraction, a fraction with a B.P. above 300° F. and the gas stream produced from the catalytic reforming.

U.S. Pat. No. 3,753,891 discloses fractionating a straight run naphtha into a light naphtha fraction containing the $C_6$ and a substantial portion of the $C_7$ hydrocarbons and a heavy naphtha fraction boiling from about 200° to 400° F.; then reforming the light fraction to convert naphthenes to aromatics over a pt-alumina catalyst or a bimetallic reforming catalyst; separately reforming the heavy fraction; then upgrading the reformer effluent of the low boiling fraction over a ZSM-5 type zeolite catalyst to crack the paraffins; and recovering an effluent with improved octane rating.

While these patents disclose split feed reforming, these patents do not disclose enhancing benzene yield by: splitting a feed into a *lighter fraction, such as a* $C_6$ fraction containing at least 10% by volume of $C_{7+}$ hydrocarbons and a *heavier fraction, such as a* $C_{7+}$ fraction; catalytically aromatizing the [$C_6$] *lighter* fraction over a catalyst superior in reforming $C_6$ [and $C_7$], *$C_7$, and $C_8$* paraffins; catalytically reforming the [$C_{7+}$] *heavier* fraction; and recovering the effluents.

SUMMARY OF THE INVENTION

It has now been found that the benzene yields produced upon reforming a full boiling range hydrocarbon feed can be increased with improved efficiencies by first separating the feed into three [fractions,] *fractions: first fraction, such as a* $C_{5-}$ [fraction,] *fraction; lighter fraction, such as* a $C_6$ fraction containing at least 10% by volume of $C_{7+}$ [hydrocarbons,] *hydrocarbons;* and a *heavier fraction, such as a* $C_{7+}$ fraction. The [$C_6$] *lighter* fraction is subjected to a catalytic aromatization process and a $C_{5+}$ effluent is separated. The [$C_{7+}$] *heavier* fraction is subject to a catalytic reforming process and a $C_{8-}$ *effluent is separated from a C9+* effluent. The $C_{5+}$ effluent from the catalytic reformer are then mixed and the aromatic content is recovered. This process maximizes the benzene production by efficiently producing benzene from a [$C_6$] *lighter* fraction by catalytic aromatization and also obtains the benefits of benzene production of the [$C_{7+}$] *heavier* fraction in a catalytic reformer.

DESCRIPTION OF THE DRAWINGS

The reforming processes will be described in more detail by reference to the drawings of which.

DETAILED DESCRIPTION OF THE INVENTION

Figure 1:
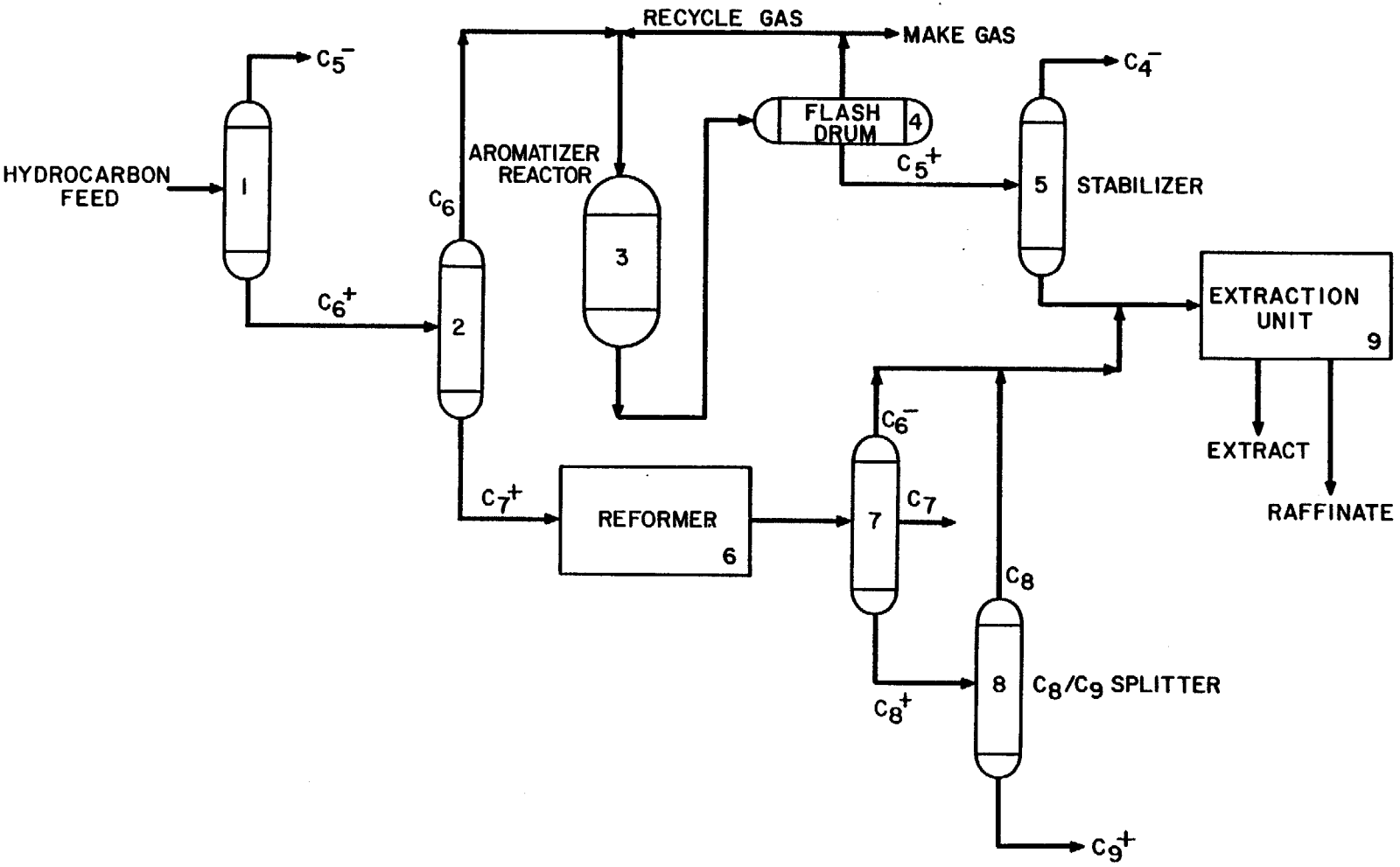
FIG. 1 is a flow diagram of the reforming process of the invention.

In accord with this invention, the first step of this process involves separating a full boiling range hydrocarbon feed into three fractions (cuts). The three fractions are a $C_{5-}$ fraction (hydrocarbons having a five carbon atom content or less), a $C_6$ fraction containing at least 10% by volume of $C_{7+}$ hydrocarbons and a $C_{7+}$ fraction (hydrocarbons containing seven carbon atoms and greater). This separation is suitably and preferably carried out in distillation columns to give the specified fractions. Unless otherwise specified, the fractions contain greater than 90%, preferably at least 95% of the stated hydrocarbons. Advantageously, the $C_6$ fraction containing at least 10 vol. % of $C_{7+}$ hydrocarbons can be separated in a fractionator with less energy being required as compared to having a $C_6$ fraction with a lower $C_{7+}$ content. For example, fractionating a $C_6$ fraction containing 15% $C_{7+}$ hydrocarbons requires 15% less energy that fractionating a $C_6$ fraction containing 5% $C_{7+}$ hydrocarbons. Generally, the $C_6$ fraction contains from 10 to 50% by volume of $C_{7+}$ hydrocarbons, and preferably from 15 to 35% by volume of $C_{7+}$ hydrocarbons. The fractionation can be carried out, as shown in FIG. 1, wherein the hydrocarbon feed is first fractionated into the $C_{5-}$ fraction and a $C_{6+}$ fraction in the first column and then in a second column separated into the $C_6$ fraction and the $C_{7+}$ fraction.

The separated $C_6$ fraction which contains at least 10% by volume of $C_{7+}$ hydrocarbons, is then subject to a catalytic aromatization process wherein it is contacted with a catalyst which at elevated temperatures and in the presence of hydrogen causes the $C_6$ and greater paraffins to form into six carbon atom rings and thereafter causes these rings to dehydrogenate to aromatics. The aromatization catalyst for this process include catalysts which convert the $C_6$ paraffins to benzene at a high selectivity and yield generally converting $C_6$ paraffins at a yield of at least 30% by volume of $C_6$ paraffins in the feed and a selectivity of at least 50% of the $C_6$ paraffins to benzene, preferably converting $C_6$ paraffins to benzene at a yield of at least 40% by volume of $C_6$ paraffins in the feed and at a selectivity of at least 55% of $C_6$ paraffins to benzene. Suitable catalysts include non-acidic catalysts which contain a non-acidic carrier and at least one noble metal of Group VIII of the periodic table. In general the catalyst employed will comprise other elements including those from Groups 6-B, 7-B, 1-B, 4-A, 6-A of the periodic table, loaded on an amorphous silica, amorphous alumina or zeolitic supports with the preferred catalysts being chosen for its ability to maximize benzene yield.

The preferred catalyst is a platinum-zeolite L (see U.S. Pat. No. 4,104,320 which is incorporated herein by reference). This catalyst has been shown to have high yields and selectivity in producing aromatic compounds from paraffins, more specifically providing efficient dehydrocyclization of $C_6$ paraffins. The Zeolite L and its preparation is described in U.S. Pat. Nos. 3,216,789 and 3,867,512 and in U.K. Application No. 82-14147, filed May 14, 1982. The aromatization is carried out with a catalyst comprising a Type L Zeolite having an exchangeable cations and a noble metal having a dehydrogenating effect. Generally at least 90% of the exchangeable cations are metal ions selected from sodium, lithium, barium, calcium, potassium, strontium, [rhubidium] *rubidium* and cesium with the preferred metal ion being potassium. The Zeolite L also contains at least one metal selected from the group consisting of metals of Group VIII of the periodic table of elements, tin and germanium, said metal or metals including at least one metal from Group VIII of the periodic table having a dehydrogenating effect with the preferred noble metal being platinum, preferably at a range of 0.1–1.5% by weight. With a pt-K Zeolite L catalyst yields of 40 to 50% by volume of $C_6$ paraffins in the feed and a selectivity of 55 to 70% of the $C_6$ paraffins to benzene have been observed. The dehydrocyclization is carried out in the presence of hydrogen, generally at hydrogen to hydrocarbon mole ratios of 2 to 20, preferably 3 to 10, pressures of from about 110 to 1750 KPa and at temperatures of about 430° to 550° C.

The effluent from the catalytic aromatization of the $C_6$ fraction contains a high yield of benzene from which a $C_{5+}$ effluent is separated. In addition, the $C_{7+}$ hydrocarbons in the $C_6$ fractions are efficiently converted to aromatics such as toluene. A $C_{5+}$ effluent is efficiently separated from the effluent of the aromatization unit due to the level of $C_{7+}$ hydrocarbons present in the effluent. The $C_{7+}$ hydrocarbons present in the $C_{5+}$ effluent act as a heavy oil wash in the flash drum to efficiently remove the $C_{5+}$ hydrocarbons from the effluent.

Recovery of $C_{5+}$ hydrocarbons especially benzene from a stream containing a high benzene yield, (i.e. greater than 30 vol. %) using conventional techniques, is difficult. For example, in a reforming process containing 50 vol. % benzene (<1% $C_{7+}$ hydrocarbons), conventional recovery techniques utilizing a flash drum result in the recovery of only about 80% by volume of the benzene in the effluent. In this process, with the presence of at least 10% $C_{7+}$ hydrocarbons in the effluent, the recovery of $C_{5+}$ hydrocarbons, especially benzene is dramatically improved. For example where the effluent containing 50 volume % benzene and 25 volume % $C_{7+}$ hydrocarbons about 90% by volume of the benzene in the effluent is recovered in a flash drum.

The separated $C_{7+}$ fraction is subjected to catalytic reforming with conventional reforming catalyst. That is, it is contacted with a catalyst which at elevated temperatures and in the presence of hydrogen causes the dehydrogenation of the $C_{7+}$ alkylcyclohexanes to alkylaromatics, the dehydroisomerization of alkylcyclopentanes to alkylaromatics, the dehydrocyclization of $C_{7+}$ paraffins to alkylaromatics and the isomerization of normal paraffins to iso-paraffins. Suitable catalysts for this purpose are acidic noble metal catalysts such as platinum on an acidic alumina carrier. Such catalysts may contain more than one noble metal and additionally may contain other metals, preferably transition metals such as rhenium, iridium, tungsten, tin, bismuth and the like and halogens such as chlorine or fluorine. Catalysts of this type are available commercially. A preferred reforming catalyst is a platinum-rhenium on gamma alumina catalyst. The conventional reforming catalysts are generally efficient in converting $C_{7+}$ hydrocarbons but are generally not as effective in producing benzene from $C_6$ paraffins as the aromatization catalyst. In general, the reforming catalysts convert $C_6$ paraffins at a yield of less than 30% by volume of $C_6$ paraffins in the feed and a selectivity of less than 35% of $C_6$ paraffins to benzene.

The catalytic reforming of the $C_{7+}$ fraction is suitably carried out at temperatures of from about 400°-600° C., preferably at a temperature at least sufficient to convert at least 90% of the $C_9$ paraffins. For a platinum-rhenium gamma alumina catalyst, a temperature sufficient to convert the $C_9$ paraffins is generally at least 480° C. Conversion of the $C_9$ paraffins is desired in order to eliminate enough of the $C_9$ paraffins from the reformer effluent to produce in the solvent extraction process at aromatic extract containing a low level of non-aromatics. Since the $C_9$ paraffins boil in the same range as the $C_8$ aromatics they are difficult to remove by fractionation and in a solvent extraction process, solvents such as sulfolane do a poor job in separating $C_9$ paraffins from the aromatics. Thus, an effective way of obtaining an aromatic extract from the solvent extraction unit with a low or non-specification level of non-aromatics, such as $C_9$ paraffins, is to insure the $C_9$ paraffins are converted during catalytic reforming. The catalytic reforming is generally carried out with pressures of from about 700 to 2750 KPa and at weight hourly space velocities of 0.5 to 10 and hydrogen to feed molar ratios from about 2 to 15.

Figure 2:
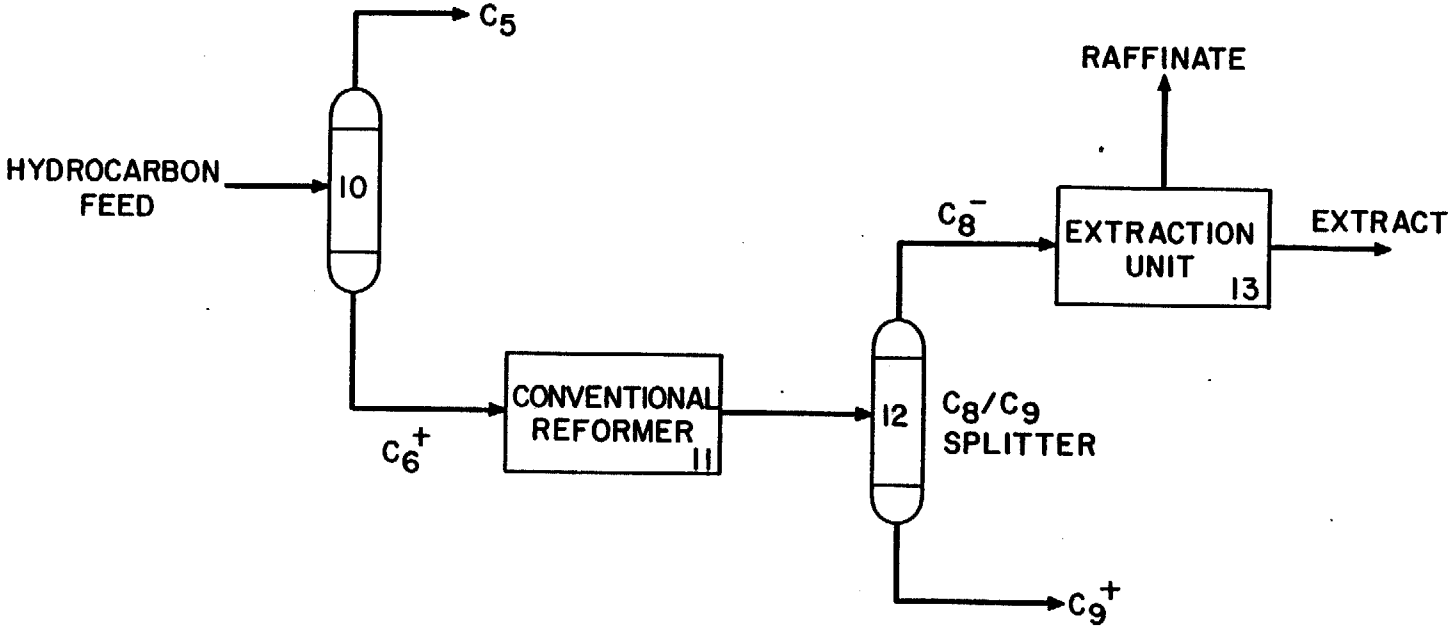
FIG. 2 is a flow diagram of a conventional reforming process.

The effluent from the catalyst reforming of the $C_{7+}$ fraction is then separated into a $C_{8-}$ effluent and a $C_{9+}$ effluent. Then the $C_{5+}$ effluent from the catalytic dehydrocyclization unit and the $C_{8-}$ effluent from the catalytic reforming unit are mixed and an aromatic extract and non-aromatic raffinate are recovered. The resultant aromatic extract contains a high yield of benzene which has been produced in an energy efficient manner. The benzene yield thus achieved for the process of this invention is in the range of 5 to 25% by volume of the $C_{6+}$ hydrocarbons and 35 to 80% by volume of the $C_6$ hydrocarbons in the full boiling range hydrocarbon feed, which compares to a benzene yield in a conventional reforming process as shown in FIG. 2, of about 2 to 10% by volume of $C_{6+}$ hydrocarbons and 10 to 35% by volume of the $C_6$ hydrocarbons in the full boiling range hydrocarbon feed. In general, for the same hydrocarbon feed, with the process of this invention there will be an increase of the benzene yield of about 1.5 to 3 times the benzene yield of a conventional reforming process as shown in FIG. 2.

The aromatic extract and non-aromatic raffinate are efficiently recovered in an aromatics recovery unit, i.e. a solvent extraction process which uses a solvent selective for aromatics such as sulfolane or tetraethylene glycol. The $C_{8-}$ effluent is preferably further separated into a $C_{6-}$ effluent and a $C_8$ effluent, with the $C_{6-}$ and $C_8$ effluent being mixed with a $C_{5+}$ effluent from the catalytic aromatization unit for subsequent recovery of an aromatics extract in the solvent extraction unit. In this way the effluent containing the $C_7$ hydrocarbons (mostly toluene) and the effluent containing $C_{9+}$ hydrocarbons are not processed in the solvent extraction process which increases the efficient use of the solvent extraction process to recover the more valuable aromatics of benzene, xylenes and ethylbenzene. The separation of the effluent from the catalytic reforming unit can be efficiently carried out by first fractionating the effluent, as shown in FIG. 1, into a $C_{6-}$ effluent, a $C_7$ effluent and a $C_{8+}$ effluent, then fractionating the $C_{8+}$ effluent into a $C_8$ effluent and a $C_{9+}$ effluent.

The non-aromatic raffinate recovered from the solvent extraction process may be recycled and added to the $C_6$ fraction feed for catalytic dehydrocyclization which increases the benzene yield of the process.

EXAMPLE 1

This example shall be described with reference to the flow diagram of FIG. 1 and the various hydrocarbon streams and units identified therein. A full boiling range naptha feedstream, comprising a range of hydrocarbons from $C_3$ to those boiling up to about 350° F. and containing 51.2% paraffins, 36% naphthenes and 12.8% aromatics is fed into distillation tower 1 to separate a $C_{5-}$ fraction from a $C_{6+}$ fraction. The resultant $C_{6+}$ fraction contains 0.7% of $C_5$ hydrocarbons 5.4% $C_{10+}$ hydrocarbons, 17.9% $C_6$ hydrocarbons and 76% $C_7$ to $C_9$ hydrocarbons while the $C_{5-}$ fraction contains 6% $C_6$ hydrocarbons and the remainder $C_{5-}$ hydrocarbons (all % by volume). The tower 1 utilizes 0.15 MBTU per barrel of feed.

The $C_{6+}$ fraction from distillation tower 1 is then fed into distillation tower 2 to separate a $C_6$ fraction which contains at least 10% $C_{7+}$ hydrocarbons from a [$C_{730}$] $C_{7+}$ fraction. The resultant $C_6$ fraction contains 3.2% $C_5$ hydrocarbons, 72.7% $C_6$ hydrocarbons and 24.1%

$C_{7+}$ hydrocarbons, with the $C_{7+}$ fraction containing 1.5% $C_6$ hydrocarbons, 91.9% $C_7$ to $C_9$ hydrocarbons and 6.6% $C_{10+}$ hydrocarbons (all % by volume). The tower 2 energy usage was 0.36 MBTU/barrel of feed. To decrease the $C_{7+}$ content in the $C_6$ fraction to 5% would require an energy usage of 0.46 MBTU/barrel of feed.

The $C_6$ fraction is fed into the aromatizer reactor 3 which contains a K Zeolite L catalyst containing 0.6% by weight of platinum with the dehydrocyclization reaction taking place at a temperature of 510° C., a weight hourly space velocity of 2.5, a pressure of 860 KPa and a hydrogen to hydrocarbon mole ratio of 6. The effluent from the aromatizer reactor 3 contains 32% benzene, 12%, toluene (all % by volume). The effluents is then fed into a flash drum 4 to separate a $C_{5+}$ effluent with about 90% of the benzene being recovered in the flash drum. The $C_{4-}$ stream containing hydrogen from the flash drum 4 is then recycled as needed to the aromatizer reactor 3 with excess used as make gas. The $C_{5+}$ effluent is then fed into a stabilizer 5 to further purify and remove any $C_{4-}$ hydrocarbons.

The $C_{7+}$ fraction is fed into a conventional reformer 6 which contains a pt-Re gamma-alumina catalyst with the reforming reaction taking place at temperatures of 919° F. (493° C.), a weight hourly space velocity of 1.3, a pressure of 1413 KPa, a recycle gas rate of 2.3 KSCF/Bbl with the unit operated to give an octane of 103. The reformer effluent contains $C_{5-}$ hydrocarbons, 1.8% benzene, 3.2% other $C_6$ hydrocarbons (excluding benzene), 12.3% toluene, 25.1% xylenes and 24% $C_{9+}$ hydrocarbons (all % by volume of reformer feed). The reformer effluent is then fed into a toluene rejection tower 7 from which a $C_7$ effluent containing 92% $C_7$ hydrocarbon (mostly toluene) is taken as a sidestream, a $C_{6-}$ effluent containing 14.1% $C_{5-}$ hydrocarbons, 11.8% benzene, 22.3% other $C_6$ hydrocarbons (excluding benzene) and 51.8% $C_7$ hydrocarbons is taken overhead and a $C_{8+}$ effluent containing 3.6% $C_7$, 49.5% $C_8$ hydrocarbons (mostly xylenes) and 46.9% $C_{9+}$ hydrocarbons (mostly aromatics) is taken from the bottom (all % by volume). The [$C_{830}$] $C_8$+ effluent is then further distilled in a $C_8/C_9$ splitter tower 8 from which a $C_8$ effluent containing 96% $C_8$ hydrocarbons and 4% $C_{9+}$ and a $C_{9+}$ effluent containing 1% $C_8$ hydrocarbons and 99% $C_{9+}$ hydrocarbons is recovered.

The $C_{5+}$ effluent from the aromatizer and the $C_{6-}$ effluent and $C_8$ effluent from the reformer are then mixed and fed into the extraction unit 9 which utilizes sulfolane to solvent extract aromatics with the aromatics extract stream containing 30% benzene, 18% toluene and 51.8% $C_8$ aromatics while the non-aromatic raffinate stream contains 0.2% aromatics. The non-aromatic raffinate stream is then advantageously feed back to tower 2 to produce benzene. The resultant benzene yield is 12.9% by volume of the $C_{6+}$ hydrocarbons in the feedstream and 66% by volume of the $C_6$ hydrocarbons in the full boiling range naptha feedstream.

EXAMPLE 2

This comparative example shall be described with reference to the flow diagram of FIG. 2. The full boiling range naptha feedstream of Example 1 is fed into distillation tower 10 to produce a $C_{6+}$ fraction as in Example 1.

The $C_{6+}$ fraction is fed into conventional reformer 11 which contains a Pt-Re gamma-alumina catalyst with the reforming reaction operated at a temperature of 920° F. (493° C.), a weight hourly space velocity of 1.3, a pressure of 1400 KPa, a recycle gas rate of 2.3 KSCF/B with the unit operated to give an octane of 101. The resultant effluent contains 4% benzene, 11% other $C_6$ hydrocarbons, 11.6% toluene, 4.5% other $C_7$ hydrocarbons, 20% $C_8$ aromatics, 19% $C_{9+}$ hydrocarbons and balance being $C_{5-}$ hydrocarbons (all % by volume of feed).

The reformer effluent is fed into a $C_8/C_9$ splitter tower 12 to separate the $C_{8-}$ effluent from the $C_{9+}$ effluent. The $C_{8-}$ effluent contains 2% $C_5$hydrocarbons, 28.6% $C_6$ hydrocarbons, 66.2% $C_7$ hydrocarbons and 3.2% $C_{9+}$ hydrocarbons and the $C_{9+}$ effluent contains 1% $C_8$ and the balance $C_{9+}$ hydrocarbons.

The $C_{8-}$ effluent is fed to a sulfolane extraction unit 13 from which an aromatic extract containing 12.8% benzene, 31.3% toluene, 53.4% $C_8$ aromatics, 2.3% $C_{9+}$ aromatics and the balance $C_{9+}$ non-aromatics hydrocarbons. The resultant benzene yield is 5.2% by volume of the [$C_{630}$] $C_6$+ hydrocarbons in the feedstream and 27.5% by volume of the $C_6$ hydrocarbons in the full boiling range naptha feedstream.

What is claimed is:

1. A process for reforming a full boiling range hydrocarbon feed to enhance benzene yield comprising:
   (a) separating the hydrocarbon feed into a $C_{5-}$ fraction, a $C_6$–$C_7$ fraction containing at least 10% by volume of $C_{7+}$ hydrocarbons, and a $C_{7+}$ fraction;
   (b) subjecting the $C_6$–$C_7$ fraction to catalytic aromatization at elevated temperatures in the presence of hydrogen and utilizing a catalyst containing a non-acidic carrier and at least one Group VIII noble metal which catalyst converts $C_6$ paraffins to benzene in a yield of at least 30% by volume and a selectivity of at least 50% and separating a $C_{5+}$ effluent:
   (c) subjecting the $C_{7+}$ fraction to catalytic reforming at elevated temperatures in the presence of hydrogen utilizing a catalyst comprising platinum on an acidic alumina carrier and separating a $C_{8-}$ effluent from a $C_{9+}$ effluent;
   (d) mixing the $C_{5+}$ effluent and $C_{8-}$ effluent from steps (b) and (c) and recovering an aromatic extract and a non-aromatic raffinate.

2. Process of claim 1 wherein the $C_{5+}$ effluent is separated in a flash drum.

3. Process of claim 2 wherein the $C_6$ fraction contains 15 to 35% by volume of $C_{7+}$ hydrocarbons.

4. Process of claim 1 wherein the catalyst for catalytic aromatization converts $C_6$ paraffins into benzene at a selectivity of at least 50% of the $C_6$ paraffins to benzene and the catalyst for catalytic reforming converts $C_6$ paraffins into benzene at a selectivity of less than 35% of $C_6$ paraffins to benzene.

5. Process of claim 4 wherein the aromatic extract and non-aromatic raffinate are recovered in a solvent extraction process.

6. Process of claim 5 wherein the catalytic reforming is carried out at temperatures sufficient to convert at least 90% of the $C_7$ paraffins.

7. Process of claim 6 wherein the catalytic reforming is carried out with a platinum-rhenium gamma alumina catalyst at temperatures of from about 480° C. to 510° C.

8. Process of claim 6 wherein the non-aromatic raffinate recovered in the solvent extraction process is recycled and added to the full boiling range naphtha prior to the separation of step (a).

9. Process of claim 5 further comprising separating the $C_{8-}$ effluent into a $C_{6-}$ effluent, a $C_7$ effluent and a $C_8$ effluent and only the $C_{6-}$ effluent and the $C_8$ effluent are mixed with the $C_{5+}$ effluent for the recovery of the aromatic extract in the solvent extraction process.

10. Process of claim 9 wherein the effluent from the catalytic reforming are separated by first fractionating the effluent into a $C_{6-}$ effluent, a $C_7$ effluent and a $C_{8+}$ effluent, then fractionating the $C_{8+}$ effluent into a $C_8$ effluent and a $C_{9+}$ effluent.

11. Process of claim 5 wherein the non-aromatic raffinate recovered in the solvent extraction process is recycled and added to the $C_6$ fraction in step (b) for catalytic aromatization.

12. Process of claim 5 wherein the solvent extraction process uses a solvent selected from the group consisting of sulfolane and tetra ethylene glycol.

13. Process of claim 4 wherein the $C_6$ fraction contains 10 to 50% by volume of $C_{7+}$ hydrocarbons.

14. Process of claim 1 wherein the platinum on acidic alumina catalyst also contains a metal chosen from the group consisting of rhenium,. iridium, tungsten, tin and bismuth.

15. Process of claim 1 wherein the catalyst for catalytic aromatization converts the $C_6$ paraffins into benzene at a yield of at least 40% by volume of $C_6$ paraffins in the feed and at a selectivity of at least 55% of $C_6$ paraffins to benzene.

16. Process of claim 15 wherein the catalyst for catalytic aromatization is a platinum type L zeolite catalyt wherein at least 90% of the exchangeable cations are metal ions selected for sodium, lithium, barium, calcium, potassium, strontium, rubidium and cesium.

17. Process of claim 16 wherein the benzene yield is from 5 to 25% by volume of the $C_{6+}$ hydrocarbons and 35 to 80% by volume of the $C_6$ hydrocarbons in the full boiling range hydrocarbon feed.

18. The process of claim 15 where the catalyst is platinum potassium type L zeolite.

19. Process of claim 1 wherein the hydrocarbon feed is a naphtha having a boiling range up to about 350° F.

*20. A process for reforming a hydrocarbon feed comprising:*

*(aseparating said hydrocarbon feed into a lighter fraction, comprising at least one member selected from the group consisting of $C_6$, $C_7$, and $C_8$ hydrocarbons, and a heavier fraction;*

*(b) reforming said lighter fraction under reforming conditions in a reformer in the presence of a non-acidic catalyst, said non-acidic catalyst comprising a non-acidic zeolite support, to produce a first reformate;*

*(c) reforming said heavier fraction under reforming conditions in the presence of an acidic catalyst to produce a second reformate;*

*(d) introducing said first reformate into an extraction unit;*

*(e) separating and removing an aromatic extract stream and a non-aromatic raffinate stream from said extraction unit; and*

*(f) recycling said non-aromatic raffinate stream to said hydrocarbon feed for reforming under reforming conditions in the presence of a non-acidic catalyst to produce a stream comprising benzene.*

*21. The process as defined by claim 20, wherein said non-acidic catalyst further comprises at least one metal selected from the group consisting of Group VIII metals, tin, and germanium, said at least one metal comprising at least one Group VIII metal having a dehydrogenating effect.*

*22. The process as defined by claim 20, wherein said zeolite is selected from the group consisting of zeolite L, zeolite X, and zeolite Y.*

*23. The process as defined by claim 22, wherein said zeolite is zeolite L.*

*24. The process as defined by claim 23, wherein said zeolite L has exchangeable cations, at least 90% of said exchangeable cations being metal ions selected from the group consisting of sodium, lithium, barium, calcium, potassium, strontium, rubidium and cesium.*

*25. The process as defined by claim 21, wherein said at least one metal comprises platinum.*

*26. The process as defined by claim 20, wherein said lighter fraction comprises $C_6$, $C_7$, and $C_8$ hydrocarbons.*

*27. The process as defined by claim 20 wherein said lighter fraction is a $C_6$-$C_7$ fraction containing at least 10% by volume $C_{7+}$ hydrocarbons, and said heavier fraction is a $C_{7+}$ fraction.*

*28. A process for reforming a hydrocarbon feed comprising:*

*(a) separating said hydrocarbon feed into a lighter fraction, comprising at least one member selected from the group consisting of $C_6$, $C_7$, and $C_8$ hydrocarbons, and a heavier fraction;*

*(b) reforming said lighter fraction under reforming conditions in the presence of a non-acidic catalyst, said non-acidic catalyst comprising a non-acidic zeolite support, to produce a first reformate;*

*(c) reforming said heavier fraction under reforming conditions in the presence of an acidic catalyst to produce a second reformate;*

*(d) introducing said first reformate into an extraction unit;*

*(e) separating and removing an aromatic extract stream and a non-aromatic raffinate stream from said extraction unit; and*

*(f) recycling said non-aromatic raffinate stream to said lighter fraction for reforming under reforming conditions in the presence of a non-acidic catalyst to produce a stream comprising benzene.*

*29. The process as defined by claim 28, wherein said non-acidic catalyst further comprises at least one metal selected from the group consisting of Group VIII metals, tin, and germanium, said at least one metal comprising at least one Group VIII metal having a dehydrogenating effect.*

*30. The process as defined by claim 28, wherein said zeolite is selected from the group consisting of zeolite L, zeolite X, and zeolite Y.*

*31. The process as defined by claim 30, wherein said zeolite is zeolite L.*

*32. The process as defined by claim 31, wherein said zeolite L has exchangeable cations, at least 90% of said exchangeable cations being metal ions selected from the group consisting of sodium, lithium, barium, calcium, potassium, strontium, rubidium and cesium.*

*33. The process as defined by claim 29, wherein said at least one metal comprises platinum.*

*34. The process as defined by claim 28, wherein said lighter fraction comprises $C_6$, $C_7$, and $C_8$ hydrocarbons.*

*35. The process as defined by claim 28, wherein said lighter fraction is a $C_6$-$C_7$ fraction containing at least 10% by volume $C_{7+}$ hydrocarbons, and said heavier fraction is a $C_{7+}$ fraction.*

*36. The process for reforming a hydrocarbon feed comprising:*

(a) separating a full boiling range naphtha feed stream into at least two fractions;

(b) contacting one of said fractions of said naphtha feed in an aromatizer reactor with a catalyst at process conditions which favor dehydrocyclization to produce an aromatics product, wherein said catalyst is a non-acidic catalyst comprising a zeolite containing at least one Group VIII metal;

(c) reforming another of said fractions of said naphtha feed in the presence of an acidic catalyst to produce an effluent;

(d) separating components comprising normal paraffins and single-branched isoparaffins present in said aromatics product as non-aromatic raffinate; and (e) recycling said non-aromatic raffinate to said one fraction of said naphtha feed to said aromatizer reactor.

37. The process as defined by claim 36 wherein said separating in step (d) is carried out by solvent extraction.

38. The process as defined by claim 37, wherein said solvent is sulfolane.

39. The process as defined by claim 36, wherein said zeolite is a type L zeolite.

40. The process as defined by claim 39, wherein said catalyst contains a metal selected from the group consisting of metals of Group VIII of the periodic table of elements, tin and germanium.

41. The process as defined by claim 40, wherein said metal includes at least one metal of the periodic table having a dehydrogenating effect.

42. The process as defined by claim 41, wherein said metal is platinum.

43. The process as defined by claim 42, wherein said catalyst comprises exchangeable cations selected from the group consisting of sodium, lithium, barium, calcium, potassium, strontium, rubidium, and cesium.

44. The process as defined by claim 43, wherein said exchangeable cation is potassium.

45. The process as defined by claim 43, wherein said exchangeable cation is barium.

46. A process for reforming a hydrocarbon feed comprising:

(aseparating said hydrocarbon feed into a first fraction and a second fraction;

(b) separating said second fraction into a lighter fraction, comprising at least one member selected from the group consisting of $C_6$, $C_7$, and $C_8$ hydrocarbons, and a heavier fraction;

(c) reforming said lighter fraction under reforming conditions in the presence of a non-acidic catalyst, said non-acidic catalyst comprising a non-acidic zeolite support, to produce a first reformate;

(d) reforming said heavier fraction under reforming conditions in the presence of an acidic catalyst to produce a second reformate;

(e) introducing said first reformate into an extraction unit; and (f) separating and removing an aromatic extract stream and a non-aromatic raffinate stream from said extraction unit;

(g) recycling said non-aromatic raffinate stream to said hydrocarbon feed for reforming under reforming conditions in the presence of a non-acidic catalyst to produce a stream comprising benzene.

47. The process as defined by claim 46, wherein said non-acidic catalyst further comprises at least one metal selected from the group consisting of Group VIII metals, tin and germanium, said at least one metal comprising at least one Group VIII metal having a dehydrogenating effect.

48. The process as defined by claim 46, wherein said zeolite is selected from the group consisting of zeolite L, zeolite X, and zeolite Y.

49. The process as defined by claim 48, wherein said zeolite is zeolite L.

50. The process as defined by claim 49, wherein said zeolite L has exchangeable cations, at least 20% of said exchangeable cations being metal ions selected from the group consisting of sodium, lithium, barium, calcium, potassium, strontium, rubidium and cesium.

51. The process as defined by claim 47, wherein said at least one metal comprises platinum.

52. The process as defined by claim 46, wherein said first fraction is a $C_5-$ fraction, and said second fraction is a $C_6+$ fraction.

53. The process as defined by claim 46, wherein said lighter fraction comprises $C_6$, $C_7$, and $C_8$ hydrocarbons.

54. A process for reforming a hydrocarbon feed comprising:

(a) separating said hydrocarbon feed into a first fraction and a second fraction;

(b) separating said second fraction into a lighter fraction, comprising at least one member selected from the group consisting of $C_6$, $C_7$, and $C_8$ hydrocarbons, and a heavier fraction;

(c) reforming said lighter fraction under reforming conditions in the presence of a non-acidic catalyst, said non-acidic catalyst comprising a non-acidic zeolite support, to produce a first reformate; and (d) reforming said heavier fraction under reforming conditions in the presence of an acidic catalyst to produce a second reformate.

(e) introducing said first reformate into an extraction unit;

(f) separating and removing an aromatic extract stream and a non-aromatic raffinate stream from said extraction unit;

(g) recycling said non-aromatic raffinate stream to said hydrocarbon feed for reforming under reforming conditions in the presence of a non-acidic catalyst to produce a stream comprising benzene.

55. The process as defined by claim 54, wherein said non-acidic catalyst further comprises at least one metal selected from the group consisting of Group VIII metals, tin, and germanium, said at least one metal comprising at least one Group VIII metal having a dehydrogenating effect.

56. The process as defined by claim 54, wherein said zeolite is selected from the group consisting of zeolite L, zeolite X, and zeolite Y.

57. The process as defined by claim 56, wherein said zeolite is zeolite L.

58. The process as defined by claim 57, wherein said zeolite L has exchangeable cations, at least 90% of said exchangeable cations being metal ions selected from the group consisting of sodium, lithium, barium, calcium, potassium, strontium, rubidium and cesium.

59. The process as defined by claim 55, wherein said at least one metal comprises platinum.

60. The process as defined by claim 54, wherein said first fraction is a $C_5-$ fraction, and said second fraction is a $C_6+$ fraction.

61. The process as defined by claim 54, wherein said lighter fraction comprises $C_6$, $C_7$, and $C_8$ hydrocarbons.

* * * * *

UNITED STATES PATENT AND TRADEMARK OFFICE

CERTIFICATE OF CORRECTION

PATENT NO. : Re. 33,323

DATED : September 4, 1990

INVENTOR(S) : J. ROARTY et al.

It is certified that error appears in the above-identified patent and that said Letters Patent is hereby corrected as shown below:

In column 9, line 45 (claim 20), change "(aseparating" to ---(a) separating---.

In column 11, line 43 (claim 46) change "(aseparating" to ---(a) separating---.

Signed and Sealed this

Ninth Day of February, 1993

*Attest:*

STEPHEN G. KUNIN

*Attesting Officer*

*Acting Commissioner of Patents and Trademarks*